United States Patent
Kariya

(10) Patent No.: US 8,432,627 B2
(45) Date of Patent: Apr. 30, 2013

(54) VIBRATION ACTUATOR, METHOD FOR MANUFACTURING VIBRATION ACTUATOR, LENS BARREL AND CAMERA

(75) Inventor: Satoshi Kariya, Yokohama (JP)

(73) Assignee: Nikon Corporation, Tokyo (JP)

( * ) Notice: Subject to any disclaimer, the term of this patent is extended or adjusted under 35 U.S.C. 154(b) by 23 days.

(21) Appl. No.: 13/000,826

(22) PCT Filed: Jun. 22, 2009

(86) PCT No.: PCT/JP2009/061313
§ 371 (c)(1),
(2), (4) Date: Feb. 11, 2011

(87) PCT Pub. No.: WO2009/157406
PCT Pub. Date: Dec. 30, 2009

(65) Prior Publication Data
US 2011/0292528 A1   Dec. 1, 2011

(30) Foreign Application Priority Data
Jun. 24, 2008 (JP) .................... 2008-164882

(51) Int. Cl.
*G02B 7/02* (2006.01)
*G02B 15/14* (2006.01)
*H01L 41/00* (2006.01)

(52) U.S. Cl.
USPC .......... 359/824; 359/822; 359/694; 359/695; 310/316.02; 310/323.02; 310/323.03; 310/323.06; 310/323.16

(58) Field of Classification Search .......... 359/822–824, 359/694, 695; 310/66, 314, 322, 323.01–323.08, 310/323.12, 323.16, 318, 321, 328, 331, 310/345, 346, 348, 366; 381/162, 163, 173, 381/190, 386; 345/173; 382/135; 29/596
See application file for complete search history.

(56) References Cited

U.S. PATENT DOCUMENTS 4,283,649 A * 8/1981 Heinouchi .............. 310/324
5,329,201 A * 7/1994 Shirasaki ............ 310/323.11
(Continued)

FOREIGN PATENT DOCUMENTS

| JP | A-11-058736 | 3/1999 |
| JP | A-2000-166262 | 6/2000 |
| JP | A-2001-069771 | 3/2001 |
| JP | A-2006-271034 | 10/2006 |

OTHER PUBLICATIONS

Japanese Publication No. 2000-166262 (Jun. 16, 2000), English translation. Pub. 1, listed in Oct. 23 Office Action listed in IDS of Nov. 9, 2012.*
Japanese Publication No. 2001-069771 (Mar. 16, 2001), English translation. Pub. 2, listed in Oct. 23 Office Action listed in IDS of Nov. 9, 2012.*
Japanese Publication No. 2006-271034 (Oct. 5, 2006), English translation. Pub. 3, listed in Oct. 23 Office Action listed in IDS of Nov. 9, 2012.*

(Continued)

*Primary Examiner* — Loha Ben
(74) *Attorney, Agent, or Firm* — Oliff & Berridge, PLC

(57) ABSTRACT

A vibration actuator having excellent driving performance, a method for manufacturing the vibration actuator, a lens barrel and a camera. The vibration actuator is provided with: an electromechanical conversion element which converts an electric energy into a mechanical energy; an elastic body which generates vibration waves by oscillation of the electromechanical conversion element; a resin layer, which is formed of a conductive thermoplastic resin and bonds the electromechanical conversion element and the elastic body with each other; and a relatively moving member which is brought into contact with the elastic body with a pressure and is relatively moved to the elastic body by vibration waves.

8 Claims, 6 Drawing Sheets

U.S. PATENT DOCUMENTS

| | | | | |
|---|---|---|---|---|
| 5,352,950 | A * | 10/1994 | Shirasaki | 310/323.11 |
| 5,557,157 | A * | 9/1996 | Shirasaki | 310/323.11 |
| 5,654,604 | A * | 8/1997 | Ashizawa et al. | 310/323.03 |
| 5,854,528 | A * | 12/1998 | Nishikura et al. | 310/323.01 |
| 6,051,911 | A * | 4/2000 | Kojima et al. | 310/366 |
| 6,072,267 | A * | 6/2000 | Atsuta | 310/323.06 |
| 6,175,181 | B1 * | 1/2001 | Shirasaki | 310/323.04 |
| 6,229,245 | B1 * | 5/2001 | Kitani | 310/316.02 |
| 6,320,299 | B1 * | 11/2001 | Kitani et al. | 310/323.04 |
| 6,414,417 | B1 | 7/2002 | Tsuyoshi et al. | |
| 6,787,971 | B2 * | 9/2004 | Kimura et al. | 310/323.02 |

OTHER PUBLICATIONS

Japanese Publication No. 2000-166262 (Jun. 16, 2000). Japanese Publication No. 2001-069771 (Mar. 16, 2001). Japanese Publication No. 2006-271034 (Oct. 5, 2006).*

Search Report issued in International Application No. PCT/JP2009/061313 dated Sep. 8, 2009.

Oct. 23, 2012 Office Action issued in JP Application No. 2008-164882 (with English translation).

* cited by examiner

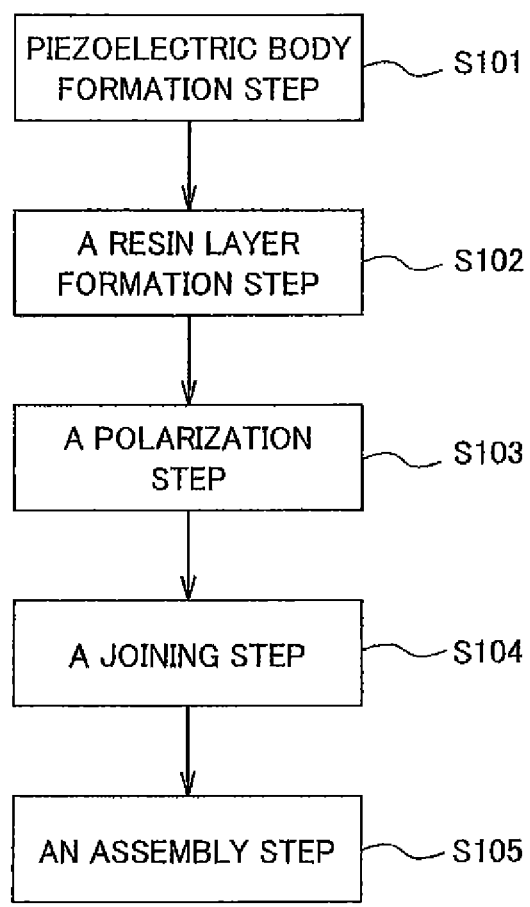

VIBRATION ACTUATOR, METHOD FOR MANUFACTURING VIBRATION ACTUATOR, LENS BARREL AND CAMERA

TECHNICAL FIELD

The present invention relates to a vibration actuator, a method for manufacturing a vibration actuator, and a lens barrel and a camera.

BACKGROUND ART

Conventionally, a vibration actuator is known that produces a progressive vibration wave (hereinafter referred to as "progressive wave") at a contact surface between an elastic body and a relative motion member using the expansion and contraction of an electromechanical conversion element, and drives the relative motion member by bringing the relative motion member into pressurized contact with a crest of a wave of an elliptical motion produced at the drive surface by the progressive wave. Generally, in such a vibration actuator, the electromechanical conversion element and the elastic body are joined by an adhesive.

An example is described in Patent Document 1 in which end face electrodes of a laminated piezoelectric element facing each other are connected to a common electrode using an adhesive having electrical conductivity.

PRIOR TECHNICAL DOCUMENTS

Patent Documents

Patent Document 1: Japanese Unexamined Patent Application, Publication No. H11-58736

DISCLOSURE OF THE INVENTION

Problems to be Solved by the Invention

With regards to the film thickness of such an adhesive agent layer that joins the elastic body and the electromechanical conversion element, unevenness may occur in the thickness due to the planarity or accuracy in dimension at the joint surface of the electromechanical conversion element or the elastic body, planarity at the electrode portion formed at the joint surface of the electromechanical conversion element, or the like. In particular, if an electrode portion is formed using silver paste or the like, the thickness at the center portion tends to be formed thinner than at an end portion of the electrode portion, and the film thickness of the adhesive agent layer formed between the electrode portion and the elastic body tends to be uneven.

Due to such unevenness in the film thickness of the adhesive agent layer, there has been a problem in that unevenness arises of the magnitude of vibration transmitted from the electromechanical conversion element to the elastic body, and the drive of the vibration actuator becomes unstable, whereby the drive efficiency declines.

An object of the present invention is to provide a vibration actuator that has excellent driving performance, a method for manufacturing the vibration actuator, and a lens barrel and a camera.

Means for Solving the Problems

The present invention solves the above object by the following solution.

A vibration actuator according to one aspect of the invention includes: an electromechanical conversion element that transforms electrical energy into mechanical energy; an elastic body that produces a vibration wave by excitation of the electromechanical conversion element; a resin layer that is formed of a thermoplastic resin having electrical conductivity and joins the electromechanical conversion element and the elastic body; and a relative motion member which is brought into pressurized contact with the elastic body, and moves relatively to the elastic body by way of the vibration wave.

According to some embodiments, an entire area of a surface of the resin layer on a side of the electromechanical conversion element directly contacts the electromechanical conversion element.

According to some embodiments, the resin layer is an electrode portion that inputs electrical energy to the electromechanical conversion element.

According to some embodiments, an entire area of a surface of the electromechanical conversion element on a side of the elastic body directly contacts the resin layer.

According to some embodiments, the electromechanical conversion element has a second electrode portion formed using a thermoplastic resin having electrical conductivity on a surface of the electromechanical conversion element on an opposite side to the elastic body.

Another aspect of the invention relates to a method for manufacturing a vibration actuator, including: a resin layer formation step of forming a resin layer by applying a thermoplastic resin having electrical conductivity to an electromechanical conversion element; a polarization step of polarizing the electromechanical conversion element using the resin layer; and a joining step of joining the electromechanical conversion element and an elastic body using the resin layer.

Another aspect of the invention relates to a lens barrel having a vibration actuator as described above.

Another aspect of the invention relates to a camera a vibration actuator as described above.

The above-mentioned configuration is not limited to this. The configuration of the embodiments described below may be improved as appropriate, and at least a portion thereof may be substituted with another structure. Furthermore, the elements not having a particular limitation in the arrangement of the present invention are not limited to the arrangements disclosed in the embodiments, and may be arranged at locations where the functions thereof can be achieved.

Effects of the Invention

According to the present invention, it is possible to provide a vibration actuator that has excellent driving performance, a method for manufacturing the vibration actuator, and a lens barrel and a camera.

BRIEF DESCRIPTION OF THE DRAWINGS

FIG. 5 is a process chart illustrating a method for manufacturing the ultrasonic motor according to the embodiment;

PREFERRED MODE FOR CARRYING OUT THE INVENTION

Hereafter, embodiments of the present invention will be described in detail with reference to the accompanying drawings. It should be noted that the present embodiment will be described providing an example of an ultrasonic motor that uses ultrasonic wave vibration region as the vibration actuator.

Figure 1:
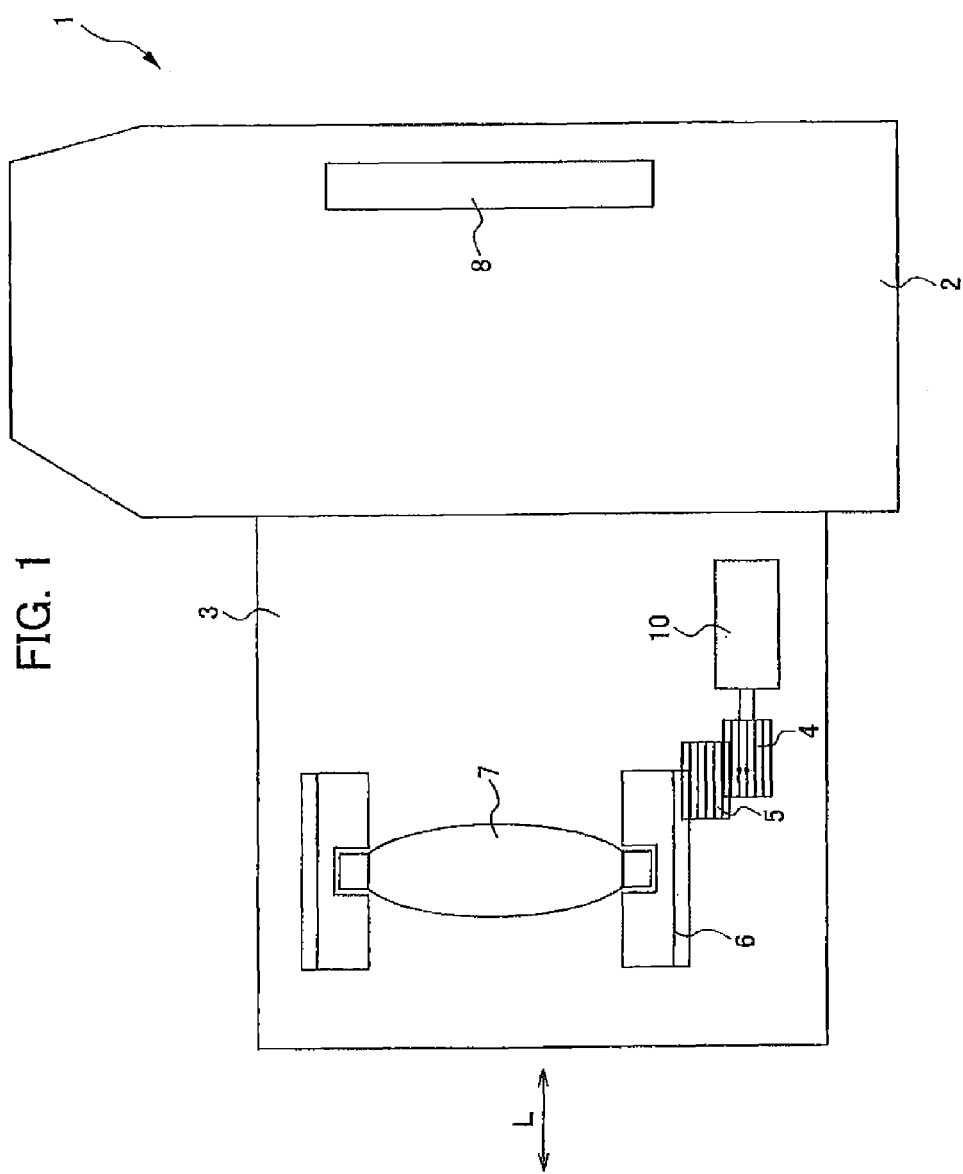
FIG. 1 is a diagram illustrating a camera according to an embodiment.

FIG. 1 shows a diagram illustrating a camera 1 according to the present embodiment.

The camera 1 according to the present embodiment is provided with a camera body 2 having an imaging element 8, and a lens barrel 3 having a lens 7.

The lens barrel 3 is an interchangeable lens that can be detached from and attached to the camera body 2. It should be noted that, although an example in which the lens barrel 3 is an interchangeable lens in the present embodiment, it is not limited to this, and may be configured to be a lens barrel integrated with the camera body, for example.

The lens barrel 3 includes the lens 7, a cam tube 6, gears 4 and 5, an ultrasonic motor 10, and the like. The ultrasonic motor 10 according to the present embodiment is used as a drive source that drives the lens 7 at the time of a focusing operation of the camera 1. The drive force obtained from the ultrasonic motor 10 is transferred to the cam tube 6 through the gears 4 and 5. The lens 7 is held by the cam tube 6, and is a focus lens which performs focal adjustment by moving in a direction substantially parallel with the optical axis direction (direction of the arrow L shown in FIG. 1) by means of driving force of the ultrasonic motor 10.

In FIG. 1, an object image is formed on an imaging surface of the imaging element 8 by means of a lens unit (including the lens 7), which is not illustrated, provided in the lens barrel 3. With the imaging element 8, the object image thus formed is converted into an electrical signal, and image data can be obtained by performing A/D conversion on this signal.

Figure 2:
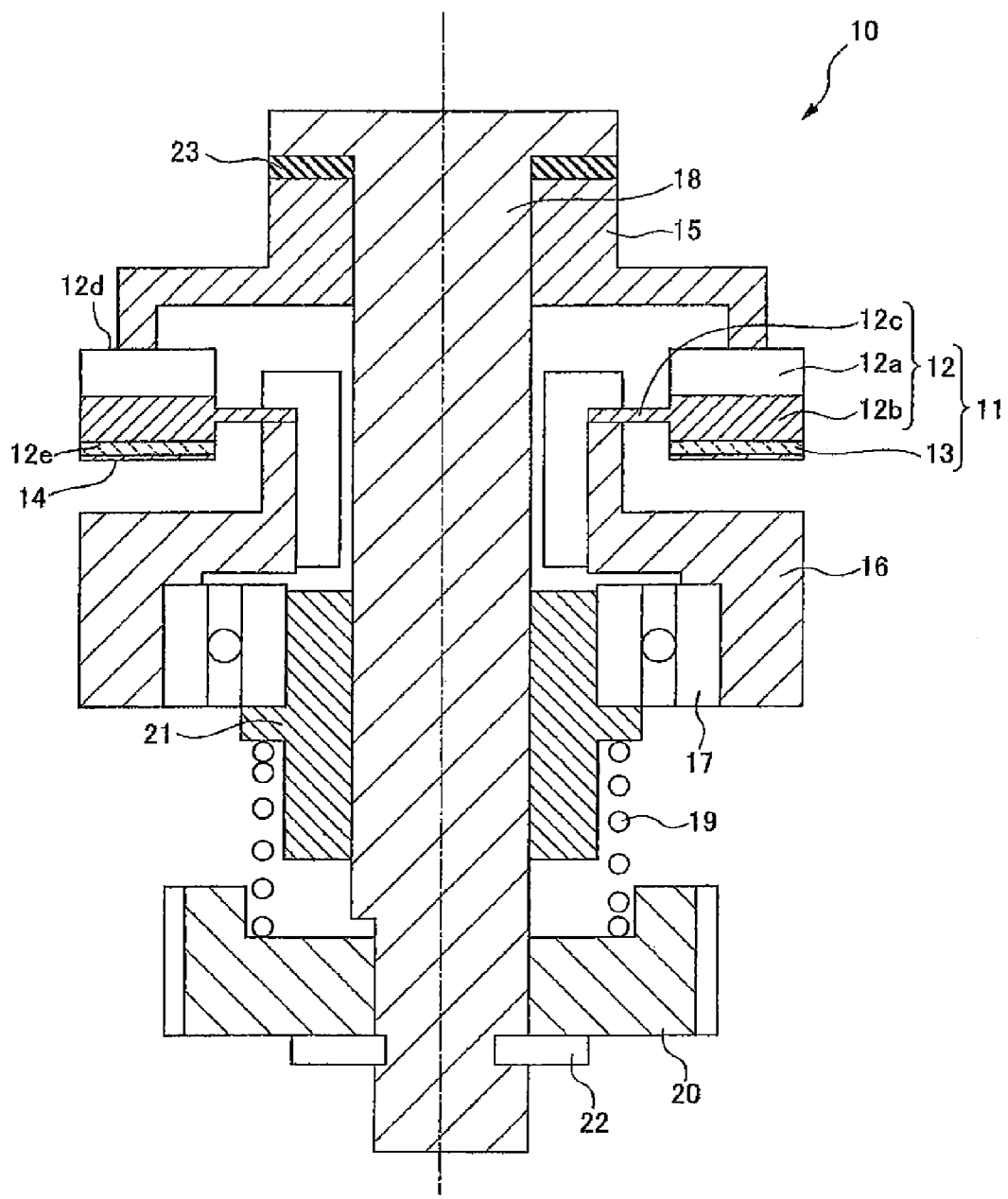
FIG. 2 is a cross-sectional view of an ultrasonic motor according to the embodiment.

FIG. 2 shows a cross-sectional view of the ultrasonic motor 10 according to the present embodiment.

The ultrasonic motor 10 according to the present embodiment includes a vibrating element 11, a moving element 15, an output shaft 18, a pressurizing member 19, and the like, and is in a configuration in which a side of the vibrating element 11 is fixed and the moving element 15 is rotationally driven.

The vibrating element 11 is a substantially ring-shaped member having an elastic body 12 and a piezoelectric body 13.

The elastic body 12 is formed of metallic material having a large degree of resonance sharpness, and the shape thereof is substantially ring-shaped. The elastic body 12 has a comb-tooth portion 12a, a base portion 12b, and a flange portion 12c.

The comb-tooth portion 12a is formed by cutting out a plurality of grooves in a surface on an opposite side to a surface to which the piezoelectric body 13 is joined. The apical surface of the comb-tooth portion 12a brought into pressurized contact with the moving element 15 to serve as a drive surface 12d that drives the moving element 15. Lubricative surface treatment, such as Ni—P (nickel-phosphorus) plating, is conducted on the drive surface 12d. The reason for providing the comb-tooth portion 12a is to bring a neutral plane of the progressive wave produced at the drive surface by elasticity of the piezoelectric body 13 close to the piezoelectric body 13 side as much as possible, thereby causing the amplitude of the progressive wave of the drive surface to be amplified.

The base portion 12b is a portion extending continuously in the circumference direction of the elastic body 12, and the piezoelectric body 13 is joined at a surface (joint surface 12e) of the base portion 12b on an opposite side to the comb-tooth portion 12a.

The flange portion 12c is a sword guard-shaped portion that projects in the direction of the inner diameter of the elastic body 12, and is arranged at the center of the base portion 12b in the thickness direction. The vibrating element 11 is fixed to the fixing member 16 with this flange portion 12c.

The piezoelectric body 13 is an electromechanical conversion element that converts electrical energy into mechanical energy. Although a piezoelectric element is used as the piezoelectric body 13 in the present embodiment, an electrostriction element may be used.

The piezoelectric body 13 according to the present embodiment is a substantially ring-shaped member, and is formed using PZT (lead zirconate titanate). It should be noted that the piezoelectric body 13 may use other piezoelectric ceramic materials.

At the surface of the piezoelectric body 13 on an elastic body 12 side (hereinafter referred to as "joint surface 13a"), a resin layer 24 is formed on the entire area (refer to FIG. 3A and FIG. 4A). The piezoelectric body 13 is joined to the elastic body 12 through the resin layer 24.

In addition, an electrode pattern portion 25 is formed at a surface (hereinafter referred to as "the other surface 13b") of the piezoelectric body 13 on an opposite side to the elastic body 12 (refer to FIG. 3B and FIG. 4A). The details of the resin layer 24 and the electrode pattern portion 25 will be described later.

In a flexible printed circuit board 14, the wiring thereof is electrically connected to each electrode portion of the electrode pattern portion 25 formed on the other surface 13b of the piezoelectric body 13.

A drive signal is supplied from a control circuit that is not illustrated to the flexible printed circuit board 14 and the piezoelectric body 13 expands and contracts, and excites by this drive signal. In the vibrating element 11, a progressive wave is produced at the drive surface of the elastic body 12 by the expansion and contraction of the piezoelectric body 13.

The moving element 15 is a member rotationally driven by the progressive wave produced at the drive surface 12d of the elastic body 12. The moving element 15 according to the present embodiment is formed of a light metal such as aluminum, and a surface treatment such as alumite for improving wear and abrasion resistance is conducted on the surface of the face contacting with the vibrating element 11 (drive surface 12d of the elastic body 12).

The output shaft 18 is a substantially cylindrically-shaped member. One end of the output shaft 18 is in contact with the moving element 15 through a rubber member 23 and the output shaft 18 is provided so as to rotate together with the moving element 15.

The rubber member 23 is a substantially ring-shaped member formed of rubber. This rubber member 23 has a function of making the moving element 15 and the output shaft 18 rotate together with viscoelasticity due to the rubber, and a function of absorbing vibration so as not to transfer the vibration from the moving element 15 to the output shaft 18. The rubber member 23 is formed of butyl rubber, silicone rubber, propylene rubber, or others.

The pressurizing member 19 is a member that produces a pressurizing force that brings the vibrating element 11 and the moving element 15 into pressurized contact with each other. The pressurizing member 19 is provided between a gear member 20 and a bearing receptacle member 21. Although the pressurizing member 19 according to the present embodiment uses a compression coil spring, the present invention is not limited thereto.

The gear member 20 is arranged to be inserted so as to fit into a D-shaped cut formed at a predetermined location of the output shaft 18, to be fixed with a stopper 22 such as an E-shaped ring, and to be integrated with the output shaft 18 in the rotational direction and the axial direction. The gear member 20 transfers driving force to the gear 4 (refer to FIG. 1) by rotating together with the rotation of the output shaft 18.

Moreover, the bearing receptacle member 21 is arranged on a bore side of the bearing 17, and the bearing 17 is a structure that is arranged on a bore side of the fixing member 16.

The pressurizing member 19 presses the vibrating element 11 in the axial direction of the output shaft 18 to the moving element 15 side, and with this pressurizing force, the moving element 15 and the vibrating element 11 come into pressurized contact, and the moving element 15 is rotationally driven. It should be noted that a pressurizing force adjustment washer may be provided between the pressurizing member 19 and the bearing receptacle member 21 so as to obtain a pressuring force suitable for driving the ultrasonic motor 10.

Figure 3A:
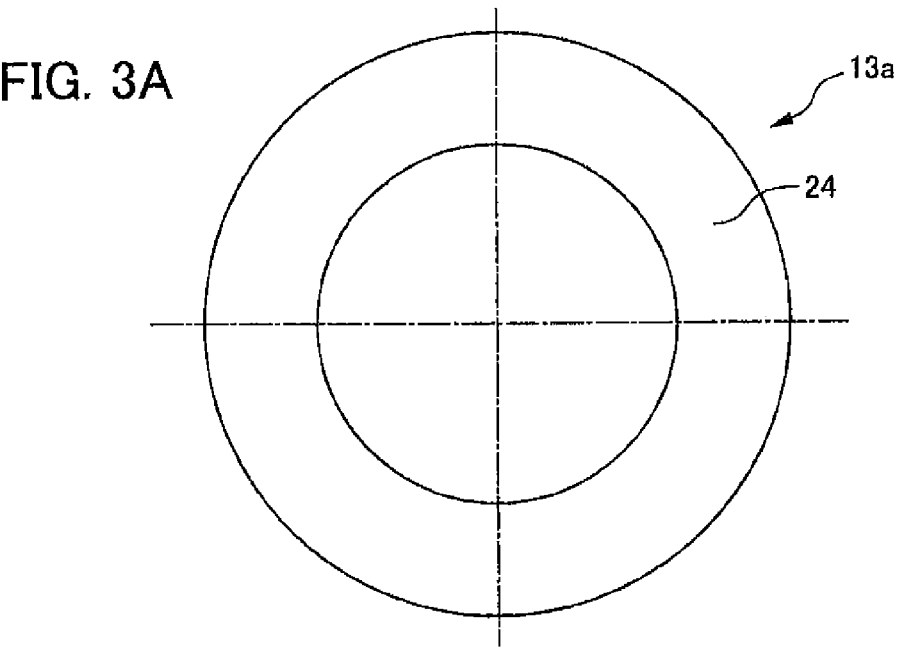
FIG. 3A is a diagram illustrating a resin layer and an electrode pattern portion according to the embodiment.
Figure 3B:
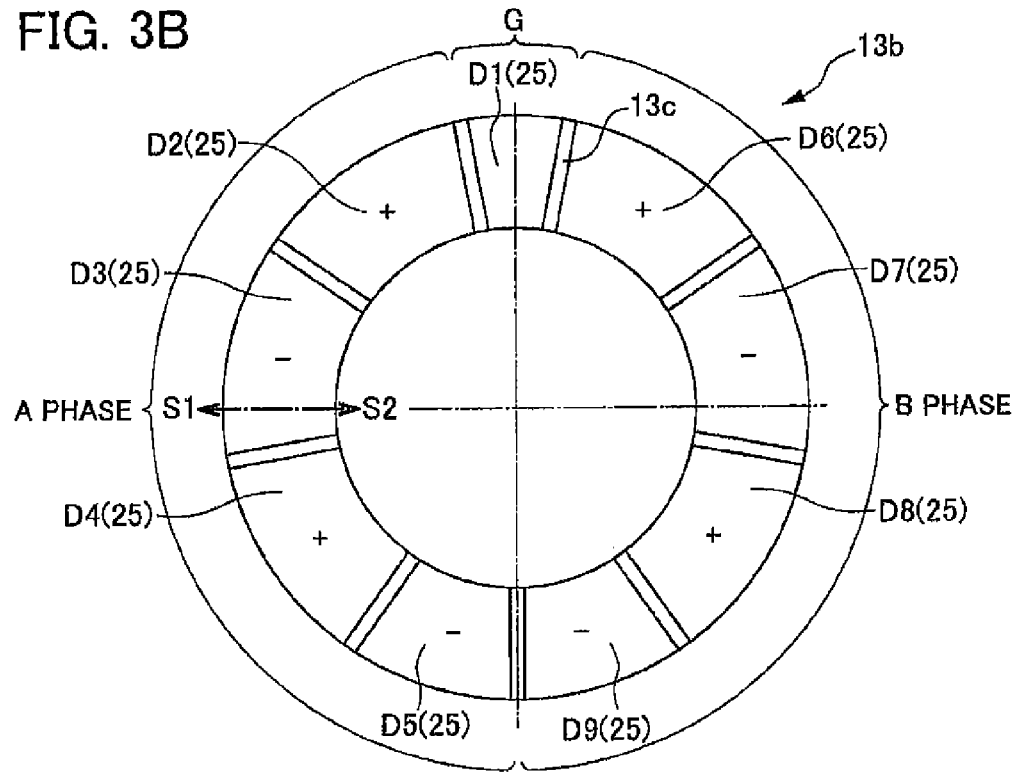
FIG. 3B is a diagram illustrating a resin layer and an electrode pattern portion according to the embodiment.

FIG. 3 is a diagram illustrating the resin layer 24 and the electrode pattern portion 25 according to the present embodiment. FIG. 3A is a diagram of the piezoelectric body 13 viewed from the elastic body 12 side, and FIG. 3B is a diagram of the piezoelectric body 13 viewed from the gear member 20 side.

Figure 4A:
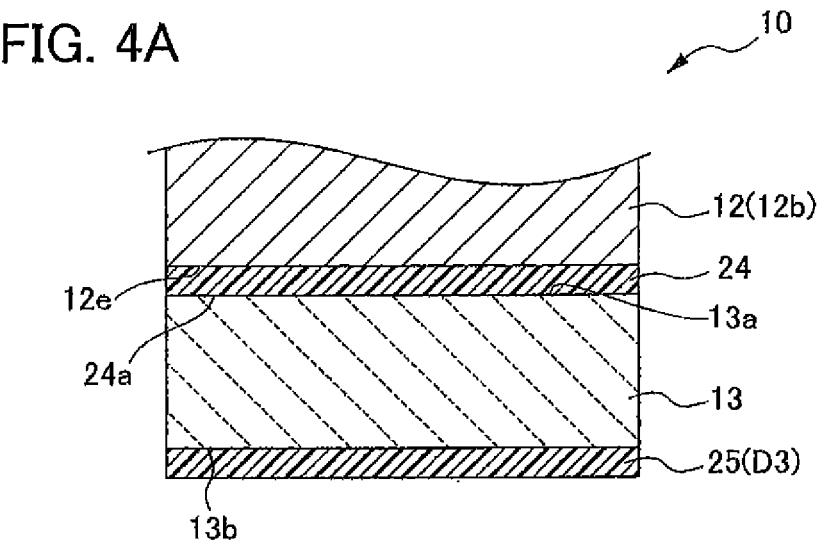
FIG. 4A is a diagram for comparing the piezoelectric body and the elastic body in an ultrasonic motor according to the embodiment and an ultrasonic motor of a comparative example.
Figure 4B:
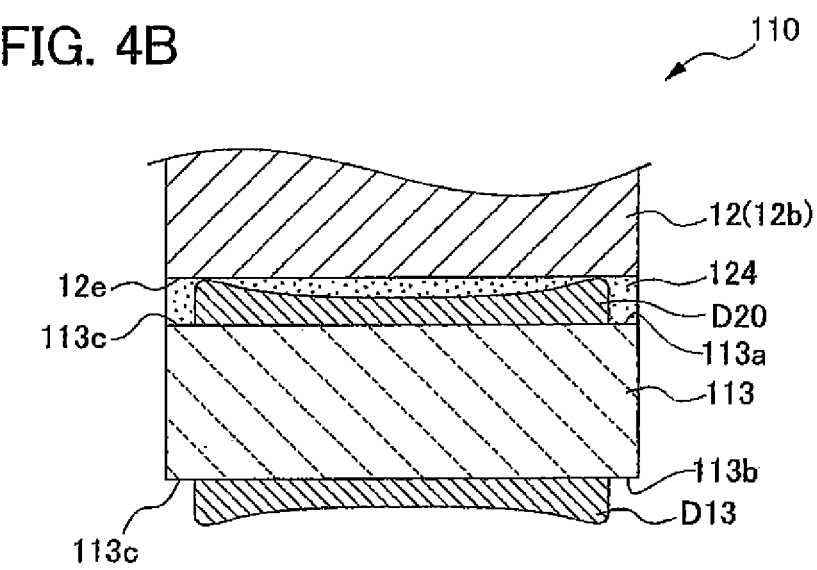
FIG. 4B is a diagram for comparing the piezoelectric body and the elastic body in an ultrasonic motor according to the embodiment and an ultrasonic motor of a comparative example.

FIG. 4 is a diagram comparing the joint portion of the piezoelectric body and the elastic body of the ultrasonic motor 10 according to the present embodiment and an ultrasonic motor 110 of a comparative example described later. FIG. 4A shows an enlarged view of a cross section sectioning the vibrating element 11 of the ultrasonic motor 10 according to the present embodiment in a direction orthogonal to the joint surface 13a of the piezoelectric body 13 along a straight line S1-S2 shown in FIG. 3. FIG. 4B is an enlarged view of a cross section corresponding to the cross section shown in FIG. 4A for the ultrasonic motor 110 of the comparative example to be described later. It should be noted that, in FIGS. 4A and 4B, the flexible printed circuit board 14 and the like are omitted for facilitating understanding.

As shown in FIG. 3A, the resin layer 24 is formed on the entire surface of the joint surface 13a of the piezoelectric body 13. Moreover, as shown in FIG. 4A, a surface 24A of the resin layer 24 on a piezoelectric body 13 side is arranged so that the entire surface thereof directly contacts the joint surface 13a of the piezoelectric body 13. Therefore, other members do not intervene between the piezoelectric body 13 and the resin layer 24 and the elastic body 12, the resin layer 24 and the piezoelectric body 13 are in a configuration sequentially laminated in the thickness direction of the vibrating element 11.

The resin layer 24 is formed of a thermoplastic resin having electrical conductivity, and polyamide is used in the present embodiment. As for the thermoplastic resin which forms the resin layer 24, it is preferable for the thermoplastic resin to be excellent in heat resistivity and durability, and to excel in adhesiveness to join the elastic body 12 and the piezoelectric body 13. For example, a general-purpose resin such as polystyrene, ethylene vinyl acetate copolymer, and PMMA (polymethylmethacrylate) may be selected as appropriate. In addition, a general-purpose engineering resin such as polyamide, polybutylene terephthalate, polyethylene terephthalate, ultra-high molecular weight polyethylene, and polycarbonate may be selected as appropriate. Furthermore, a super engineering resin such as polyamide imide, polyether ketone and polyphenylene sulfide may be selected as appropriate. Moreover, these may be used by combining as appropriate. It should be noted that electrical conductivity may be imparted to these resins by blending a predetermined amount of electrically conductive fillers (carbon black, metallic powder, metal oxide powder, and the like).

Since the resin layer 24 has electrical conductivity, in addition to a function of joining the elastic body 12 and the piezoelectric body 13, the resin layer 24 also has a function as an electrode portion for providing electrical energy to the piezoelectric body 13 from the control circuit, and a function of securing the conductivity with the elastic body 12.

The electrode pattern portion 25 is an electrode portion formed directly on the other surface 13b so that the electrode portion D1 to be the ground and the electrode portions D2 to D5 and D6 to D9 to which electrical signals of A phase and B phase are inputted are spaced apart at predetermined intervals in the circumferential direction. Moreover, between the electrode portions D1 to D9 in the circumferential direction of the other surface 13b are basis material portions 13c where the basis material of the piezoelectric body 13 is exposed.

The electrode portions D2 to D5 and D6 to D9 are electrode portions to be inputted driving signals of A phase and B phase, respectively, and are respectively arranged so that alternate polarization is produced in each phase. The electrode portion D1 is formed between the electrode portion D2 and the electrode portion D6 so as to be between A phase (electrode portions D2 to D5) and B phase (electrode portions D6 to D9).

The electrode pattern portion 25 is formed using a thermoplastic resin having electrical conductivity, and is formed of polyamide in the present embodiment, similarly to the resin layer 24. Moreover, although not illustrated in FIG. 3B, the flexible printed circuit board 14 is connected to each of the electrode portions D1 to D9 of the electrode pattern portion 25.

Next, a method for manufacturing the ultrasonic motor 10 according to the present embodiment will be described.

FIG. 5 is a process chart showing the method for manufacturing the ultrasonic motor 10 according to the present embodiment.

FIG. 6 is a diagram illustrating the manufacturing process of the vibrating element 11 according to the present embodiment. For facilitating understanding, FIG. 6 shows the same cross section as the cross section shown in FIG. 4.

The ultrasonic motor 10 is manufactured through steps such as a piezoelectric body formation step S101, a resin layer formation step S102, a polarization step S103, a joining step S104 and an assembly step S105.

Figure 6A:
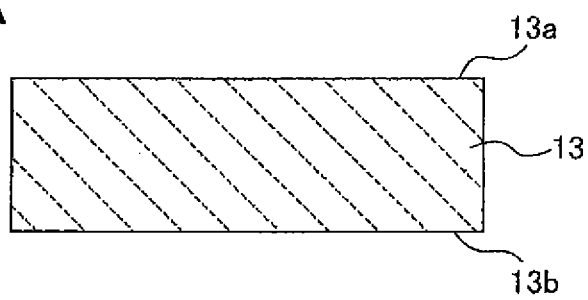
FIG. 6A is a diagram illustrating manufacturing step of the vibrating element according to the embodiment.

The piezoelectric body formation step S101 is a step of producing the piezoelectric body 13 by, for example, molding a material such as lead zirconate titanate into a substantially ring shape using a mold or the like, and sintering the molded material. When distortion or the like is occurs in the piezoelectric body 13 from the sintering, a lap process or the like may be performed to raise the planarity of the joint surface 13a and the other surface 13b, as shown in FIG. 6A.

The resin layer formation step S102 is a step of applying a thermoplastic resin having electrical conductivity onto the joint surface 13a of the piezoelectric body 13. The thermoplastic resin (polyamide in the present embodiment) is heated up to a predetermined temperature, and a solution obtained by blending a filler imparting electrical conductivity, a solvent, and the like is applied onto the joint surface 13a of the piezoelectric body 13, cooled, and then made to cure to such an extent that there is no trouble in workability. As a result, the resin layer 24 is formed.

Moreover, at the other surface 13b of the piezoelectric body 13, the same solution as the one used for the resin layer 24 is applied in a pattern and cooled to form the electrode pattern portion 25. At this time, masking or the like may be conducted on portions that will be the basis material portion 13c between each electrode portion or the like, if necessary.

Figure 6B:
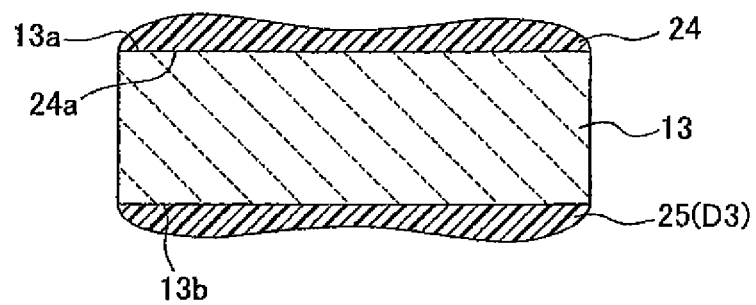
FIG. 6B is a diagram illustrating manufacturing step of the vibrating element according to the embodiment.
Figure 6C:
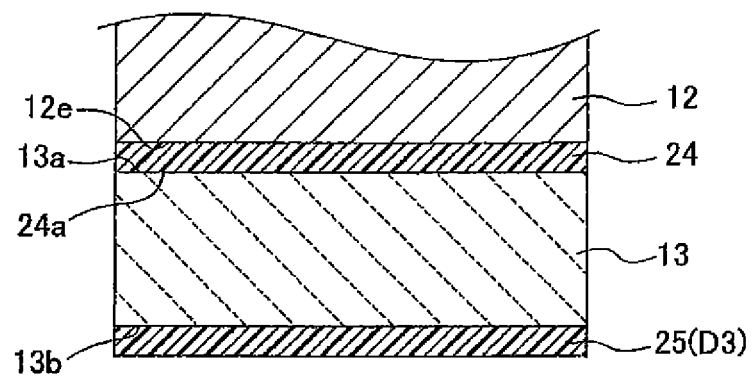
FIG. 6C is a diagram illustrating manufacturing step of the vibrating element according to the embodiment.

As shown in FIG. 6B, in a situation where a thermoplastic resin having electrical conductivity is applied, there is some unevenness in thickness of the resin layer 24 and the electrode pattern portion 25.

The polarization step S103 is a step of polarizing by applying a polarization voltage, using a predetermined power source, to the piezoelectric body 13 in a state where the resin layer 24 and the electrode pattern portion 25 have been formed.

Usually, it is necessary to perform polarization by sandwiching the piezoelectric body 13 with a positive electrode and a negative electrode. However, in the present embodiment, the resin layer 24 and the electrode pattern portion 25 are formed using a thermoplastic resin having electrical conductivity; therefore, it is possible to polarize the piezoelectric body 13 without the need to form electrodes with silver paste as is conventionally. In the polarization step S103, polarization is performed using the resin layer 24 formed on the joint surface 13a of the piezoelectric body 13 as one electrode portion and using the electrode pattern portion 25 formed on the other surface 13b as the other electrode portion.

The joining step S104 is a step of joining the piezoelectric body 13 and the elastic body 12.

An elastic body made by cutting work or the like is prepared in advance for the elastic body 12.

Then, in a situation where the joint surface 12e of the elastic body 12 and the surface of the resin layer 24 (surface on a side opposite to the piezoelectric body 13) are in contact and the flexible printed circuit board 14 is in contact with each of the electrode portions of the electrode pattern portion 25, they are fixed with a jig or the like, heated up to a predetermined temperature, applied a predetermined pressure, and cooled.

Since the resin layer 24 is formed of thermoplastic resin, it becomes soft from heat. By pressurizing the whole resin layer 24 uniformly, the resin layer 24 is shaped so that it is filled between the elastic body 12 and the piezoelectric body 13 substantially uniformly in thickness, cures by cooling, thereby joining the elastic body 12 and the piezoelectric body 13 (refer FIG. 6C).

Since the electrode pattern portion 25 is formed of a thermoplastic resin similarly to the resin layer 24, it is softened from heat, and cures with pressurization and cooling, whereby the wiring of the flexible printed circuit board 14 is joined and connected to each electrode portion. At this time, by means of a jig or the like, the electrode pattern portion 25 is pressurized to the piezoelectric body 13 side, and the thickness of the electrode pattern portion 25 is made substantially uniform, and the planarity of the surface thereof (surface on an opposite side to the piezoelectric body 13) is improved (refer to FIG. 6C).

It should be noted that a polishing process or the like may be performed after the joining step S104 in order to ensure the planarity of the drive surface 12d of the elastic body 12, if necessary.

The assembly step S105 is a step of assembling the ultrasonic motor 10 using the vibrating element 11 (elastic body 12 and piezoelectric body 13) made through the above steps and members such as the moving element 15, the output shaft 18, and the pressurizing member 19.

The ultrasonic motor 10 according to the present embodiment is completed through the above steps.

Referring back to FIG. 4, the ultrasonic motor 10 according to the present embodiment formed as described above, and the ultrasonic motor 110 of a comparative example will be compared herein.

As shown in FIG. 4B, the ultrasonic motor 110 of the comparative example has an electrode portion formed with silver paste at a joint surface and other surface of a piezoelectric body 113 and is substantially the same as the present embodiment except for the elastic body 12 and the piezoelectric body 113 being joined using an adhesive. Therefore, at portions serving the same function as the present embodiment, the same reference symbols or symbols having the same postfix are assigned, and duplicate descriptions are omitted as appropriate.

The piezoelectric body 113 of the comparative example is a substantially ring-shaped member, substantially the same as the piezoelectric body 13 according to the present embodiment. An electrode portion D20 extending continuously in the circumferential direction is formed at a joint surface 113a of the piezoelectric body 113, however, the basis material portion 113c where the basis material of the piezoelectric body 113 is exposed is at the outer peripheral edge and inner periphery edge of the joint surface 113a. Moreover, the electrode portions D11 to D19 divided into parts in the circumferential direction are formed in the other surface 113b, and the basis material portion 113c where the basis material of the piezoelectric body 113 is exposed is formed at the outer peripheral edge and the inner periphery edge between each electrode and on the other surface 113b. It should be noted that only the electrode portions D20 and D13 are illustrated in FIG. 4B.

The piezoelectric body 113 in this comparative example is a typical piezoelectric body that is widely used, and the electrode portions D20 and D11 to D19 are formed by applying silver paste by way of screen printing.

The piezoelectric body 113 and the elastic body 12 of the comparative example are joined using a common adhesive (for example, adhesive with epoxy resin or the like as a base resin). For this reason, a configuration is made in which an adhesive layer 124 and the electrode portion D20 are formed between the elastic body 12 and the piezoelectric body 113. Moreover, the adhesive agent layer 124 does not have electrical conductivity.

Accordingly, the surface of the electrode portion D20 formed of silver paste has little surface roughness compared with the surface of the basis material portion 113c of the piezoelectric body 113 and the joint surface 12e of the elastic body 12. Therefore, supposing that the electrode portion D20 is formed on the entire surface of the joint surface 113a of the piezoelectric body 113 an anchoring effect by the adhesive agent would be small and sufficient adhesive strength would not be obtained. Consequently, by making the inner periphery edge and the outer peripheral edge of the joint surface 113a of the piezoelectric body 113 to be the basis material portion 113c and providing a portion where the basis material portion 113c having a coarse surface and the adhesive layer 124 contact directly, it is possible to sufficiently obtain an anchoring effect of the adhesive, thereby obtaining a predetermined adhesion strength.

However, since the inner periphery edge and the outer peripheral edge of the joint surface 113a of the piezoelectric body 113 are made to be the basis material portion 113c, the region where the piezoelectric body 113 is polarized is small compared with an ideal piezoelectric body where electrode portions are formed on the entire surface of the piezoelectric body. Therefore, in the piezoelectric body 113 of the comparative example, driving performance is poor such as in that the electrostatic capacity is small, output power is small, and power consumption is large, compared with an ideal piezoelectric body where electrode portions are formed on the entire surface.

In addition, since the electrode portion D20 is formed by screen printing, as shown in FIG. 4B, unevenness tends to occur in the thickness of the electrode portion D20 in that both ends of the piezoelectric body 13 in the radial direction become thick (5-10 μm), and the center portion becomes thin (2-3 μm).

Therefore, unevenness in the thickness occurs in that the adhesive layer 124 is thick at the center portion of the radial direction of the electrode portion D20, and is thin at both portions in the radial direction of the electrode portion D20. The transmission efficiency to transmit excitation of the piezoelectric body 13 to the elastic body 12 at portions where the adhesive agent layer 124 is thick declines compared to at thin portions, therefore, the transmission of the excitation of the piezoelectric body 13 to the elastic body 12 becomes uneven. As a result, there is a problem in that the driving performance declines in that the drive of the ultrasonic motor 110 becomes unstable so as to cause the drive efficiency to decline, because of such unevenness in the thickness of the adhesive layer 124.

Moreover, there is a problem in that the adhesion strength between the elastic body 12 and the piezoelectric body 13 becomes uneven due to the unevenness in the thickness in the adhesive agent layer 124 and malfunctions occur such as a case where the piezoelectric body 113 is peeled off when driving the ultrasonic motor 110.

Furthermore, since the adhesive layer 124 of the ultrasonic motor 110 in the comparative example does not have electrical conductivity, it is necessary to make a configuration in which a part of the electrode portion D20 and the elastic body 12 are in contact with each other in order to secure the conductivity between the electrode portion D20 and the elastic body 12. For this reason, there is a problem in that it is necessary to join the elastic body 12 and the piezoelectric body 113 by applying a large pressurizing force, and thus manufacture is difficult, and a problem in that the piezoelectric body 113 is damaged or the like by pressurization.

In addition to this, since the piezoelectric body 113 and the elastic body 12 in the comparative example are joined by the adhesive layer 124, it is not possible to disassemble once the piezoelectric body 113 and the elastic body 12 are joined. Therefore, the piezoelectric body 113 and the elastic body 12 cannot be separated to reuse the piezoelectric body 113 in such a case where a defect arises in the elastic body 12 in the manufacturing process or the like.

In contrast, in the present embodiment, the elastic body 12 and the piezoelectric body 13 are joined through the resin layer 24 having a uniform thickness, which is formed of a thermoplastic resin having electrical conductivity, and thus no other members exist between the piezoelectric body 13 and the resin layer 24. That is, since only one layer, the resin layer 24, exists between the elastic body 12 and the piezoelectric body 13 and the thickness thereof is substantially uniform, no unevenness occurs in the transmission of the vibration from the piezoelectric body 13 to the elastic body 12. Therefore, according to the present embodiment, it is possible to stably drive the ultrasonic motor 10, improve the drive efficiency, and improve driving performance.

Moreover, since the resin layer 24 can be formed in a shape where it is directly contacting the entire surface of the joint surface 13a of the piezoelectric body 13a sufficient anchoring effect is obtained, whereby the adhesion strength between the piezoelectric body 13 and the elastic body 12 improves. Therefore, it is possible to improve the durability and drive efficiency of the ultrasonic motor.

Furthermore, since the resin layer 24 has electrical conductivity, it is not necessary to apply a large pressure in the joining step, and it is possible to easily manufacture the vibrating element 11 without damaging the piezoelectric body 13.

Furthermore, since the resin layer 24 can be formed on substantially the entire surface of the joint surface 13a, it is not necessary to perform positioning, and thus the manufacture of the vibrating element 11 is easy and the production cost can be curbed.

In addition, the resin layer 24 can be formed in a shape where it directly contact the entire surface of the joint surface 13a of the piezoelectric body 13 and the electrode pattern portion 25 can also be formed from end to end without providing with basis material portions at both edges of the other surface 13b in the radial direction, therefore, it is possible to increase the polarized surface area of the piezoelectric body 13 and possible to increase electrostatic capacity.

Accordingly, it is possible to improve drive efficiency of the ultrasonic motor 10 and realize an increase in output power. In addition, since the resin layer 24 is formed of a thermoplastic resin, the resin layer 24 becomes soft by heating even in a state in which the piezoelectric body 13 and the elastic body 12 are joined by the resin layer 24 in a case such as when a defect arises in the elastic body 12, for example, and thus it is possible to easily separate the elastic body 12 and the piezoelectric body 13. Therefore, according to the present embodiment, the piezoelectric body 13 can be reused, and thus it is possible to use resources effectively.

As described above, according to the present embodiment, it is possible to achieve an ultrasonic motor having excellent driving performance.

Modified Embodiment (1) Various modifications and improvements are possible without being limited to the embodiments described above.

In the present embodiment, an examples has been illustrated in which the resin layer 24 is formed directly on the piezoelectric body 13 and no other members exist between the piezoelectric body 13 and the resin layer 24. However, the present invention is not limited thereto, and a configuration may be made in which a resin layer is formed on the joint surface of the piezoelectric body 113, which has the electrode portion D20 formed with silver paste, by coating a thermoplastic resin having electrical conductivity, as in the ultrasonic motor 110 of the comparative example, and the elastic body 12 and the piezoelectric body are joined by this resin layer.

Since the resin layer has electrical conductivity by making such a configuration, it is not necessary to apply a large pressure in the joining step of the elastic body 12 and the piezoelectric body 113 in order to secure the conductivity between the elastic body 12 and the piezoelectric body 113 as is conventionally, and thus it is possible to join them easily. Moreover, by making such a configuration, the piezoelectric body 13 and the elastic body 12 can be easily separated simply by heating up to a predetermined temperature. Therefore, it is possible to reuse the piezoelectric body and the like, and use resources effectively.

(2) Although an example is illustrated in the present embodiment in which the electrode pattern portion 25 is formed with a similar resin as the resin layer 24, it is not limited thereto, and may be formed of thermoplastic resin having electrical conductivity that is different from the resin layer 24, so as long as having heat resistivity and durability capable of enduring the high temperatures at the time of polarization, and other circumstances, and may be formed using silver paste or the like.

(3) Although an example of the ultrasonic motor 10 in which the moving element 15 is rotationally driven is described in the present embodiment, the present invention is not limited thereto, and may be applied to a linear type vibration actuator where the moving element is driven linearly.

(4) Although an example of the ultrasonic motor 10 using vibration in ultrasonic range is described in the present embodiment, the present invention is not limited thereto, and may be applied to a vibration actuator which uses vibration other than in the ultrasonic range, for example.

(5) Although an example is described in the present embodiment in which the ultrasonic motor 10 is used for driving the lens 7 at the time of a focusing operation, the present invention is not limited thereto, and may be used in an ultrasonic motor used for driving a lens at the time of zooming action.

(6) Although an example is described in the present embodiment in which the ultrasonic motor used in a camera, the present invention is not limited thereto, and may be used in a drive unit in a copier machine, or a steering-wheel tilt device or a head rest drive unit of a vehicle, for example.

It should be noted that, although the embodiment and modified embodiments can be combined as appropriate, detailed explanations are omitted. In addition, the present invention is not limited by the above-described embodiments.

EXPLANATION OF REFERENCE NUMERALS

1: camera
3: lens barrel
10: ultrasonic motor
12: elastic body
13: piezoelectric body
15: moving element
24: resin layer
25: electrode pattern portion

The invention claimed is:

1. A vibration actuator comprising:
   an electromechanical conversion element that transforms electrical energy into mechanical energy;
   an elastic body that produces a vibration wave by excitation of the electromechanical conversion element;
   a resin layer that is formed of a thermoplastic resin having electrical conductivity and joins the electromechanical conversion element and the elastic body; and
   a relative motion member which is brought into pressurized contact with the elastic body, and moves relatively to the elastic body by way of the vibration wave.

2. The vibration actuator according to claim 1, wherein an entire area of a surface of the resin layer on a side of the electromechanical conversion element directly contacts the electromechanical conversion element.

3. The vibration actuator according to claim 1, wherein the resin layer is an electrode portion that inputs electrical energy to the electromechanical conversion element.

4. The vibration actuator according to claim 1, wherein an entire area of a surface of the electromechanical conversion element on a side of the elastic body directly contacts the resin layer.

5. The vibration actuator according to claim 1, wherein the electromechanical conversion element has a second electrode portion formed using a thermoplastic resin having electrical conductivity on a surface of the electromechanical conversion element on an opposite side to the elastic body.

6. A lens barrel comprising a vibration actuator according to claim 1.

7. A camera comprising a vibration actuator according to claim 1.

8. A method for manufacturing a vibration actuator, comprising:
   a resin layer formation step of forming a resin layer by applying a thermoplastic resin having electrical conductivity to an electromechanical conversion element;
   a polarization step of polarizing the electromechanical conversion element using the resin layer; and
   a joining step of joining the electromechanical conversion element and an elastic body using the resin layer.

* * * * *